(12) United States Patent
Sakata

(10) Patent No.: US 8,854,935 B2
(45) Date of Patent: Oct. 7, 2014

(54) DISK DRIVE DEVICE

(75) Inventor: Kenji Sakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/111,487

(22) PCT Filed: Aug. 22, 2011

(86) PCT No.: PCT/JP2011/004652
§ 371 (c)(1),
(2), (4) Date: Oct. 11, 2013

(87) PCT Pub. No.: WO2013/027235
PCT Pub. Date: Feb. 28, 2013

(65) Prior Publication Data
US 2014/0029401 A1    Jan. 30, 2014

(51) Int. Cl.
G11B 20/10 (2006.01)
H04N 21/432 (2011.01)
H04N 21/426 (2011.01)
H04N 5/775 (2006.01)
G11B 20/00 (2006.01)
H04N 5/85 (2006.01)

(52) U.S. Cl.
CPC ............ *G11B 20/00* (2013.01); *H04N 21/4325* (2013.01); *H04N 21/42646* (2013.01); *H04N 5/775* (2013.01); *G11B 2220/2541* (2013.01); *G11B 20/10* (2013.01); *H04N 5/85* (2013.01)

USPC ........................................................ 369/47.16

(58) Field of Classification Search
None
See application file for complete search history.

(56) References Cited

U.S. PATENT DOCUMENTS

| 2002/0120709 A1* | 8/2002 | Chow et al. ................... 709/213 |
| 2004/0190860 A1* | 9/2004 | Ishiguchi ........................ 386/46 |
| 2008/0117548 A1 | 5/2008 | Azuma et al. |

FOREIGN PATENT DOCUMENTS

| EP | 1091353 A1 | 4/2001 |
| JP | 2001-126447 A | 5/2001 |
| JP | 2005-157693 A | 6/2005 |
| JP | 2007-26453 A | 2/2007 |
| JP | 2008-65950 A | 3/2008 |

OTHER PUBLICATIONS

International Search Report for PCT/JP2011/004652 mailed on Nov. 15, 2011.

* cited by examiner

*Primary Examiner* — Brenda Bernardi
(74) *Attorney, Agent, or Firm* — Birch, Stewart, Kolasch & Birch, LLP

(57) ABSTRACT

A front-end unit 2 includes: a communication unit 8 and a local storage 9 to be used by a CPU 4b on the board in which the front-end unit itself is arranged; and I/F units 10a, 10b that make connections in an accessible manner from the CPU 4b to the communication unit 8 and the local storage 9 in the front-end unit 2.

4 Claims, 7 Drawing Sheets

DISK DRIVE DEVICE

TECHNICAL FIELD

The present invention relates to a disk drive device in which a front-end unit and a back-end unit are configured with different boards.

BACKGROUND ART

Among conventional disk drive devices, there is the device that a front-end unit and a back-end unit are configured with different boards. In the front-end unit, processing for digitizing analog signals, namely processing for controlling a disk drive, is performed. In the back-end unit, processing for analogizing processing results of the digital signals obtained by the front-end unit, namely decoding control for videos and audios read out from a disk, is performed.

Meanwhile, in Patent Document 1, there is disclosed a storage system in which a host provided with a CPU and an ATA (Advanced Technology Attachment) controller is connected to a storage apparatus provided with a plurality of storage devices including a hard-disk drive (HDD), a flash memory drive (FMD), and the like, a drive selection unit, and an interface unit. In this system, the host controls the access to the plurality of memory devices through an ATA interface.

PRIOR ART DOCUMENTS

Patent Documents

Patent Document 1: Japanese Patent Application Laid-Open No. 2007-26453

SUMMARY OF THE INVENTION

Problems to be Solved by the Invention

Components for controlling the disk drive are arranged on the board of the front-end unit, and a disk slot in which a disk is inserted into the device by a user is provided around the board of the front-end unit. In other words, a face provided with the disk slot and faced toward a user's side is formed around the front-end unit.

On the other hand, for example, when a BD (Blu-ray Disk) is reproduced, in the processing of the back-end unit, the communication by a local storage and Ethernet (registered trademark; hereinafter, this indication will be omitted) to be required by a BD standard is necessary for the decoding control for videos and audios in the back-end unit. For this reason, in the conventional disk drive device, a communication unit of the local storage and Ethernet is mounted on the board of the back-end unit.

Thus, it is required that a connector of the local storage and Ethernet (in a case where the local storage is constituted by an attachable/detachable memory medium) is arranged on the face that is formed around the front-end unit and faced toward the user's side.

In this manner, in the conventional disk drive device, there is a need in which the connector and so on in the components mounted on the board of the back-end unit are arranged on the above face faced toward the user's side. For this reason, the back-end unit must be inevitably arranged around the front-end unit, which poses a problem such that there is a positional restriction in the placement of the back-end unit.

Meanwhile, in Patent Document 1, the following case is specified as an example: the CPU of the host controls the access to the plurality of storage devices through the ATA interface; there is no description regarding a disk drive device in which a front-end unit and a back-end unit are configured with different boards like the invention. For this reason, the invention of Patent Document 1 is directly inapplicable to the disk drive device in which the front-end unit and the back-end unit are configured with different boards.

The present invention is made to solve the problems as described above, and an object of the invention is to provide a disk drive device capable of resolving the positional restriction in the placement of the back-end unit.

Means for Solving the Problems

A disk drive device according to the invention includes: a front-end unit having a disk drive and a front-end controller for controlling the disk drive; and a back-end unit arranged on aboard different from that of the front-end unit, and including a decoder for reproducing data obtained by the corresponding front-end unit and a back-end controller for controlling the decoder, and the front-end unit includes a communication unit and a local storage to be used by the back-end controller on the board in which the front-end unit itself is arranged, and the front-end unit and the back-end unit include an interface unit that makes a connection in an accessible manner from the back-end controller to the communication unit and the local storage in the front-end unit.

Effect of the Invention

According to the invention, there is an advantageous effect such that the positional restriction in the placement of the back-end unit can be resolved.

BEST MODE FOR CARRYING OUT THE INVENTION

Hereinafter, in order to describe the present invention in more detail, embodiments for carrying out the invention will be described with reference to the attached drawings.

Embodiment 1

Figure 1:
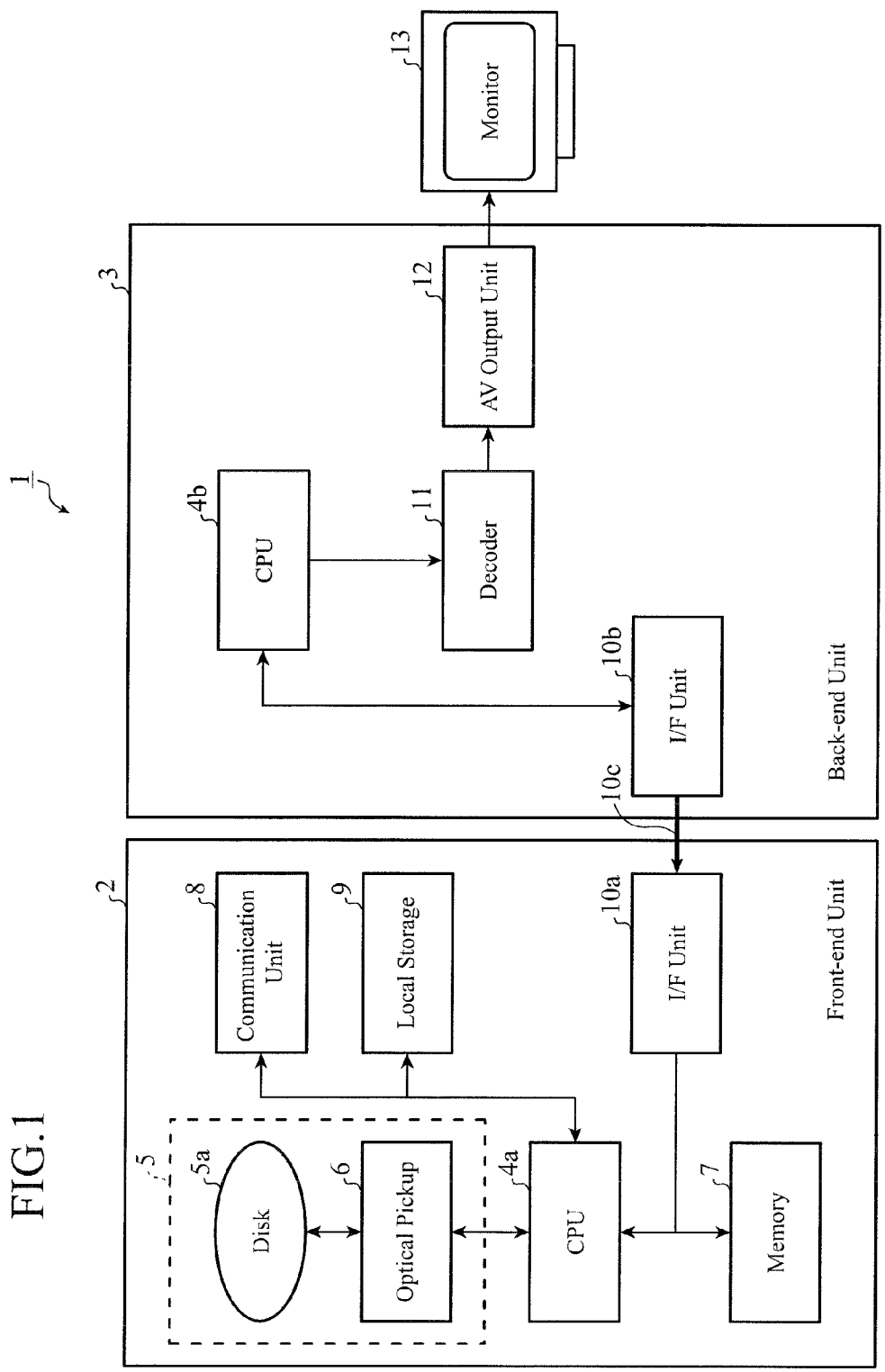
FIG. 1 is a diagram showing a configuration of a disk drive device according to Embodiment 1 of the invention.

FIG. 1 is a diagram showing a configuration of a disk drive device according to Embodiment 1 of the invention. In FIG. 1, a disk drive device 1 according to Embodiment 1 has a board configuration divided into a front-end unit 2 and a back-end unit 3.

In addition to a CPU 4a, a disk drive 5, a memory 7, and an I/F unit 10a, a communication unit 8 and a local storage 9 that are necessary for processing in the back-end unit 3 are arranged on a board of the front-end unit 2. On the other hand, a CPU 4b, an I/F unit 10b, a decoder 11, and an AV output unit 12 are arranged on a board of the back-end unit 3.

The CPU 4a of the front-end unit 2 reads out video/audio data from a disk 5a by controlling an operation of an optical pickup 6 of the disk drive 5, and transmits the data to the memory 7. The CPU 4b of the back-end unit 3 makes access to the memory 7 of the front-end unit 2 through the I/F units 10a, 10b, and a transmission cable 10c, and acquires the video/audio data read out from the disk 5a.

Then, the CPU 4b decodes the video/audio data acquired from the front-end unit 2 by controlling the decoder 11, and outputs the resultant to the AV output unit 12. The AV output unit 12 outputs the videos and audios of the decoded results by a monitor 13.

On the other hand, there are some cases in which a communication function with the communication unit 8 and a read/write access function to the local storage are necessary depending on a standard of a storage medium. For example, according to a BD standard, it is assumed that when the video/audio data read out from a BD is reproduced and output by the monitor 13, update data, newly produced content information, and the like on a network are acquired with the communication unit 8 such as Ethernet. Further, assumed is a purpose in which data produced by the use of the acquired update data and newly produced content information (for example, a high score in a game, etc.) is stored in the local storage 9.

Thus, the I/F units 10a, 10b that are communication interfaces such as ATAPI (Advanced Technology Attachment Packet Interface) are arranged therein; when the communication unit 8 and local storage 9 become necessary in the reproduction of the video/audio data by the back-end unit 3, the CPU 4b in the back-end unit 3 makes access to the communication unit 8 and local storage 9 in the front-end unit 2 through the I/F units 10a, 10b. The ATAPI is the communication interface that enables bidirectional communication between the communication unit 8 and local storage 9 in the front-end unit 2, and the CPU 4b in the back-end unit 3.

Figure 2:
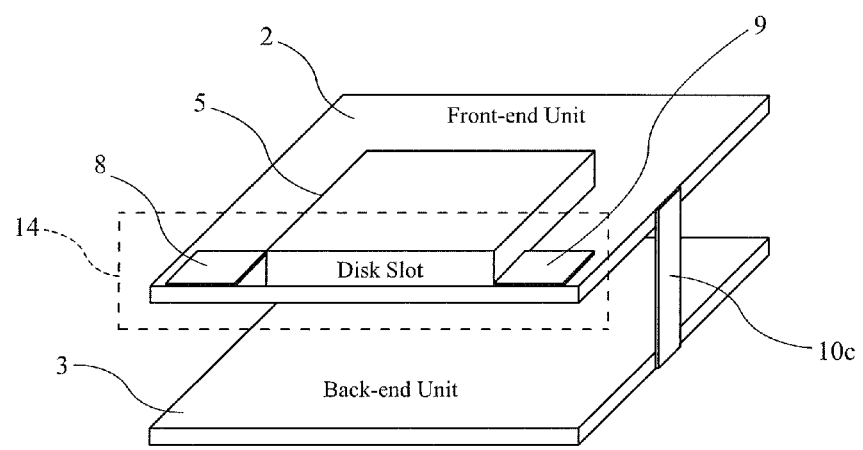
FIG. 2 is a diagram showing a board configuration of a front-end unit and a back-end unit.

FIG. 2 is a diagram showing the board configuration of the front-end unit and back-end unit. The disk drive 5 has a disk slot to be inserted into or taken out by the disk 5a. Also, an insertion slot for an Ethernet card and an Ethernet connector are formed in the communication unit 8. Further, in the case of a storage medium to be attached/detached by a user, an attaching/detaching slot therefor is provided in the local storage 9, while in the case of an external storage device, a connector for connection therefor is formed therein. These slots and connectors are arranged on a face facing toward the user's side like a front panel face 14.

Thus, in the disk drive device 1 of Embodiment 1, the disk drive 5, communication unit 8, and local storage 9 that are hardware components requiring an interface with the outside are collectively arranged on the board of the front-end unit 2 as shown in FIG. 2.

On the other hand, the back-end unit 3 makes access to the communication unit 8 and local storage 9 through the ATAPI including the I/F units 10a, 10b, and the transmission cable 10c.

With this configuration, it becomes unnecessary to arrange the board of the back-end unit 3 around the front-end unit 2, which enables to resolve a positional restriction in the placement of the back-end unit 3. For example, the front-end unit 2 may be placed in the vicinity of the front panel face 14, and the back-end unit 3 may be placed apart from the front panel face 14.

Further, since the disk drive 5, communication unit 8 and local storage 9 are the hardware components to be used corresponding to the type of the disk 5a (storage medium), these are gathered in the front-end unit 2, and only the components that reproduce the video/audio data readout from the disk 5a are placed in the back-end unit 3. Thus, when the software for data reproduction in the back-end unit 3 is just replaced, a variety of front-end units 2 according to the type of the disk 5a can be adapted with the single back-end unit 3.

As described above, according to Embodiment 1, the front-end unit 2 includes the communication unit 8 and the local storage 9 to be used by the CPU 4b on the board in which the front-end unit is arranged, and the front-end unit 2 and the back-end unit 3 include the I/F units 10a, 10b for making connections in an accessible manner from the CPU 4b to the communication unit 8 and the local storage 9 in the front-end unit 2. With this configuration, a positional restriction in the placement of the back-end unit 3 can be resolved.

Embodiment 2

In Embodiment 2, hardware components to be used depending on a type of a disk are gathered in a front-end unit, and power supplies to the components in the front-end unit are controlled depending on whether to be used by a back-end unit or not.

Figure 3:
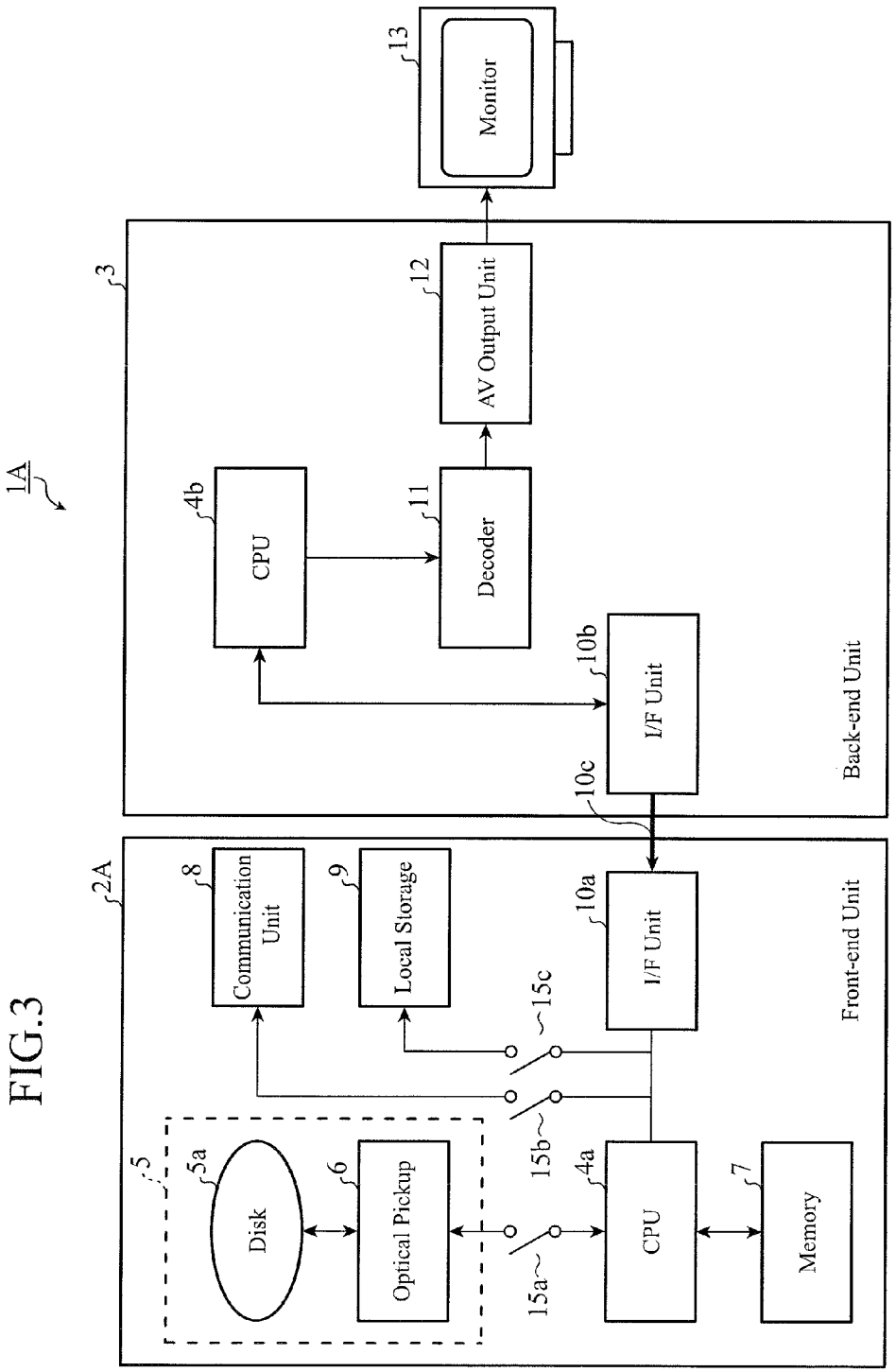
FIG. 3 is a diagram showing a configuration of a disk drive device according to Embodiment 2 of the invention.

FIG. 3 is a diagram showing a configuration of a disk drive device according to Embodiment 2 of the invention; the same reference numerals are given for the same components as those of FIG. 1 or components equivalent thereto, and detailed descriptions thereof will be omitted.

In FIG. 3, a disk drive device 1A according to Embodiment 2 has a board configuration divided into a front-end unit 2A and a back-end unit 3.

In addition to a CPU 4a, a disk drive 5, a memory 7, a communication unit 8, a local storage 9, and an I/F unit 10a, switches 15a to 15c are arranged on a board of the front-end unit 2A. On the other hand, a CPU 4b, an I/F unit 10b, a decoder 11, and an AV output unit 12 are arranged on a board of the back-end unit 3.

The switches 15a to 15c are the switches each of which the opening/closing is controlled by the CPUs 4a, 4b.

Here, the switch 15a is the switch that opens and closes a power supply to the disk drive 5. Hereinafter, the switch 15a is explained as the switch that opens and closes the power supply to an optical pickup 6 in the disk drive 5. Note that the switch 15a may open and close the power supply to the whole disk drive 5.

The switch 15b is the switch to open and close a power supply to the communication unit 8. The switch 15c is the switch to open and close a power supply to the local storage 9.

Next, an operation thereof will be described.

Figure 4:
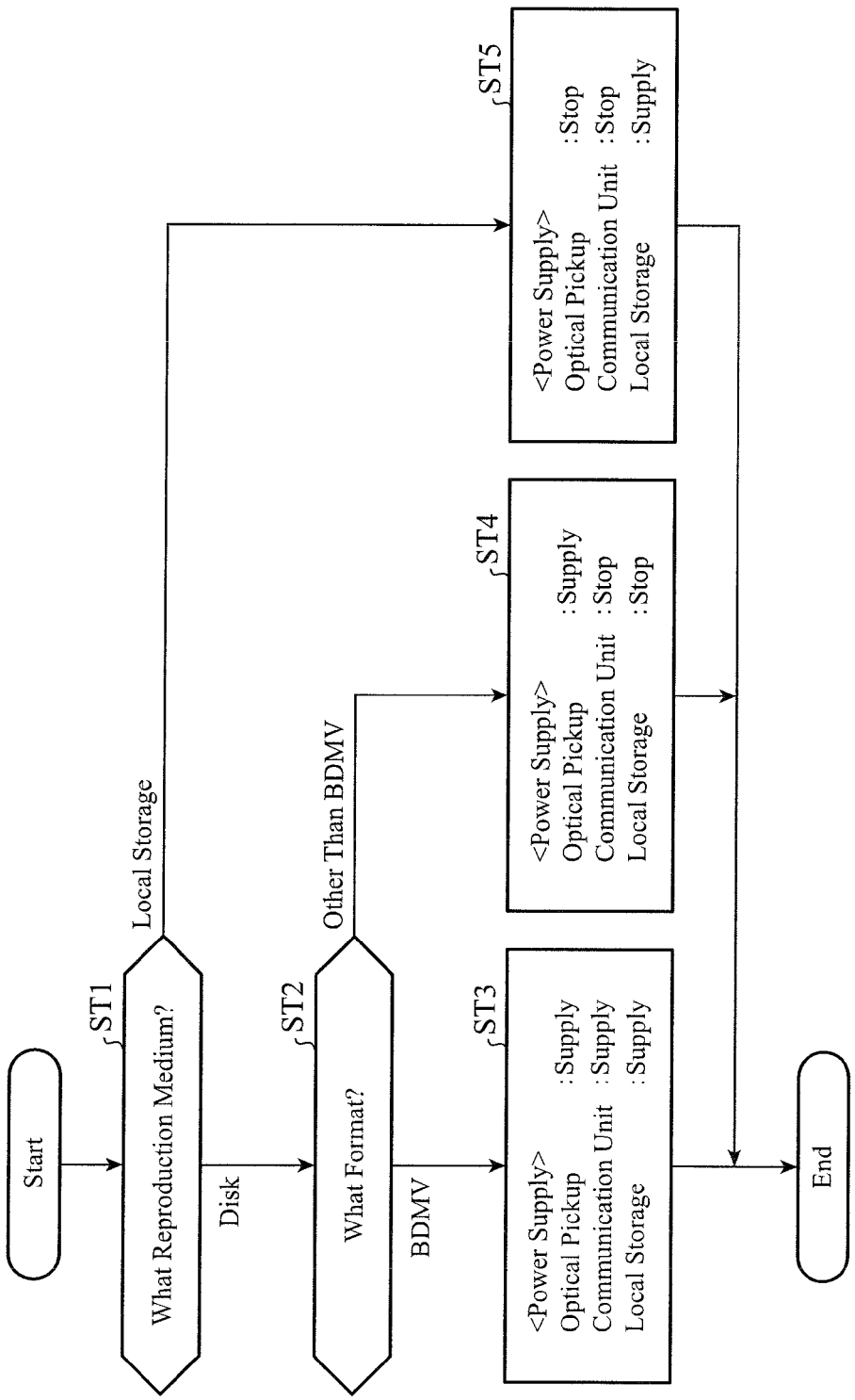
FIG. 4 is a flowchart showing an operation by the disk drive device according to Embodiment 2.

FIG. 4 is a flowchart showing the operation by the disk drive device according to Embodiment 2. The details of a control for the power supplies in Embodiment 2 will be described by reference to FIG. 4.

First, the CPU 4a in the front-end unit 2A determines a type of a storage medium (reproduction medium) in which a data readout is carried out in the front-end unit 2A (Step ST1).

For example, through an input operation from outside, if a disk reproduction at the disk drive 5 is instructed, it is determined that the reproduction medium is a disk, while if a reproduction of the local storage 9 is instructed, it is determined that the reproduction medium is a local storage.

When it is determined that the reproduction medium is a disk 5a (Step ST1; Disk), the CPU 4a controls an operation of the optical pickup 6 in the disk drive 5, and reads out video/ audio data from the disk 5a. At this time, the CPU 4a determines whether or not the format of the video/audio data is BDMV (Blu-ray Disk Movie) (Step ST2).

For example, reflected light of a laser beam irradiated from the optical pickup 6 at the disk 5a is detected, and it is determined whether the disk 5a is a BD or not from the detected reflected light. When it is determined that the disk 5a is the BD, it is determined that the video/audio data read out from the disk 5a is BDMV.

When it is determined that the format of the video/audio data is the BDMV (Step ST2; BDMV), after the data readout from the disk 5a using the optical pickup 6, the CPU 4a decides that the communication unit 8 and the local storage 9 are to be used for reproduction processing of the video/audio data in the back-end unit 3; thus, all the switches 15a to 15c are turned ON, to thereby continue the power supplies to the optical pickup 6, communication unit 8, and local storage 9 (Step ST3).

Contrarily, when it is determined that the format of the video/audio data is not the BDMV (Step ST2; Other Than BDMV), the CPU 4a decides that although the data readout using the optical pickup 6 is continued, the communication unit 8 and local storage 9 are not used for reproduction processing of the video/audio data in the back-end unit 3; thus, only the switch 15a is turned ON, and the switches 15b, 15c are turned OFF, to thereby continue the power supply to the optical pickup 6, and stop the power supplies to the communication unit 8 and the local storage 9 (Step ST4). For example, in a case where a reproduction of DVD-VIDEO is carried out, since a data acquisition by the communication unit 8 and an access to the local storage 9 associated with the acquisition are not carried out, power saving thereof can be achieved when the power supply to the communication unit 8 and local storage 9 is stopped.

On the other hand, when it is determined that the reproduction medium is the local storage 9 (Step ST1; Local Storage), the CPU 4a decides that the data readout using the optical pickup 6 and the communication processing by the communication unit 8 are not carried out; thus, only the switch 15c is turned ON, and the switches 15a, 15b are turned OFF, to thereby stop the power supplies to the optical pickup 6 and the communication unit 8, and continue the power supply to the local storage 9 (Step ST5).

As described above, according to Embodiment 2, the front-end unit 2A includes the switches 15a to 15c that are provided on the board in which the front end unit itself is arranged, and that turn on/off the power supplies to the disk drive 5, communication unit 8, and local storage 9, respectively, according to usage conditions of the disk drive 5, communication unit 8, and local storage 9. This provides a similar effect to that in Embodiment 1 described above, and further makes it possible to achieve power saving by stopping the power supply.

Embodiment 3

In Embodiment 3, there is described a configuration in which another local storage that stores the backup of the data resulted by the reproduction processing in the back-end unit is provided separately from the attachable/detachable local storage.

Figure 5:
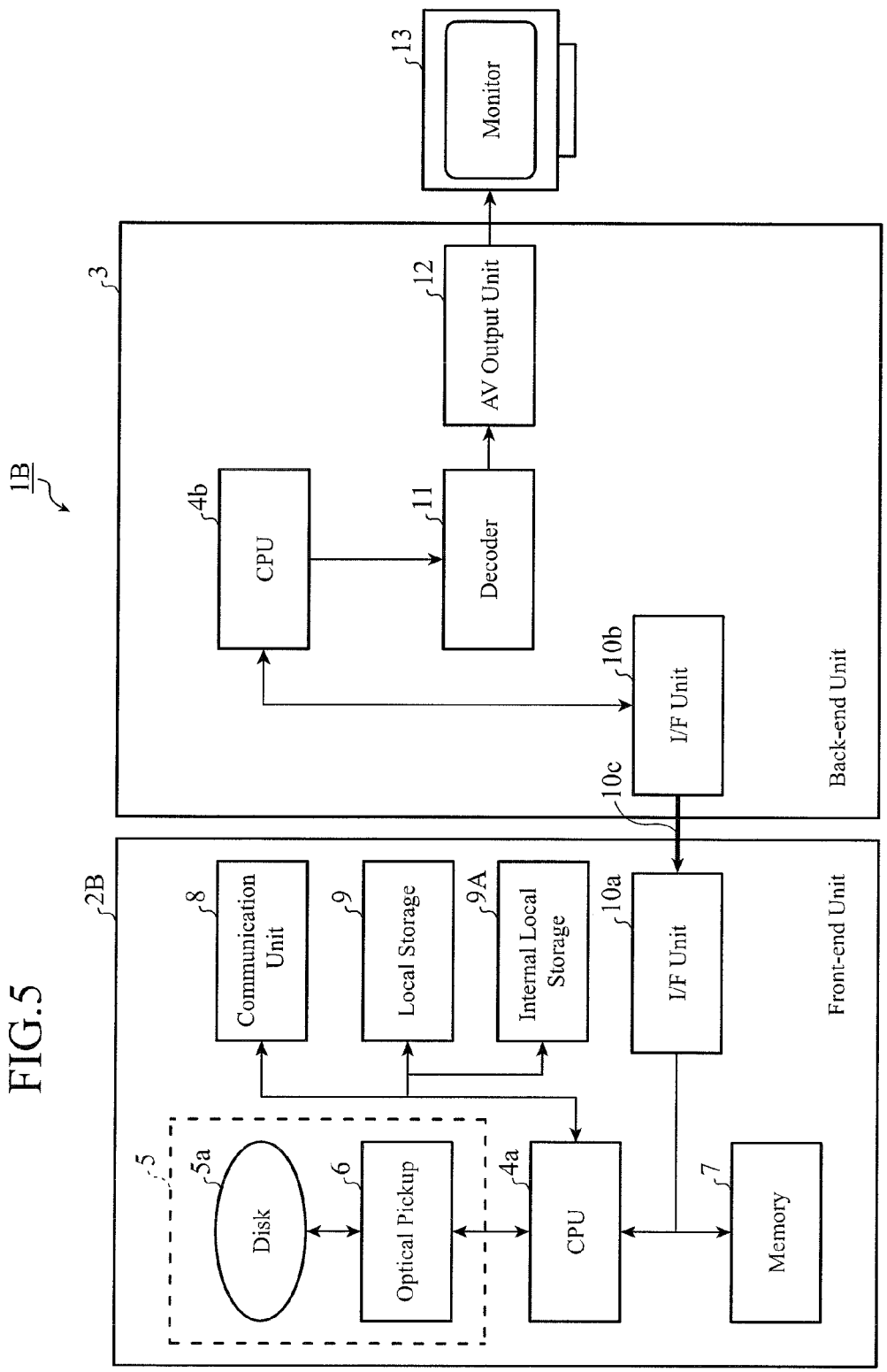
FIG. 5 is a diagram showing a configuration of a disk drive device according to Embodiment 3 of the invention.

FIG. 5 is a diagram showing a configuration of a disk drive device according to Embodiment 3 of the invention; the same reference numerals are given for the same components as those of FIG. 1 or components equivalent thereto, and detailed descriptions thereof will be omitted.

In FIG. 5, a disk drive device 1B according to Embodiment 3 has a board configuration divided into a front-end unit 2B and a back-end unit 3.

In addition to a CPU 4a, a disk drive 5, a memory 7, a communication unit 8, a local storage 9, and an I/F unit 10a, an internal local storage 9A is arranged on a board of the front-end unit 2B. On the other hand, a CPU 4b, an I/F unit 10b, a decoder 11, and an AV output unit 12 are arranged on a board of the back-end unit 3.

In Embodiment 3, the local storage 9 is constituted by a storage device that can be attached/detached by a user. For example, it is specified by a flash memory to be attached/detached through a USB connector, an SD card to be attached/detached through a card slot, and the like.

On the other hand, the internal local storage 9A is the memory unit mounted on the board of the front-end unit 2B. For example, it can be achieved by a hard disk drive (HDD) device or a RAM.

Next an operation thereof will be described.

Figure 6:
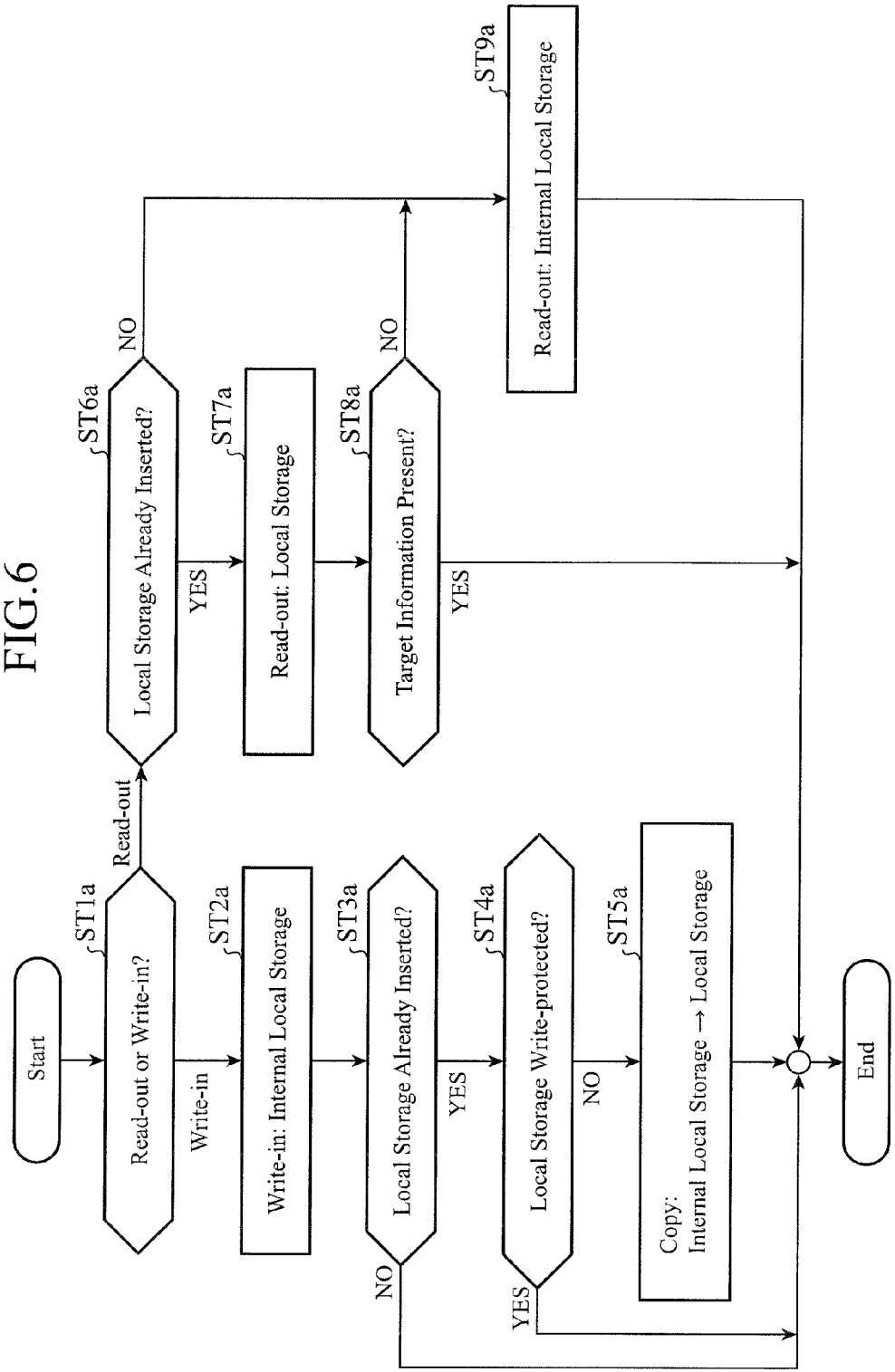
FIG. 6 is a flowchart showing an operation by the disk drive device according to Embodiment 3.

FIG. 6 is a flowchart showing the operation by the disk drive device according to Embodiment 3. The details of data preservation to the local storages in Embodiment 3 will be described by reference to FIG. 6.

First, the CPU 4a determines whether an access request to the local storages from the CPU 4b is a read-out of data or a write-in of data (Step ST1a).

For example, this corresponds to the following case: when video/audio data of BDMV is reproduced in the back-end unit 3, the CPU 4b performs data transmission processing required by a BD standard, and/or makes access to the local storage associated with the processing.

When the access request to the local storage is the write-in of data (Step ST1a; Write-in), the CPU 4a stores in the internal local storage 9A the data that is write-in requested by the CPU 4b (Step ST2a).

Thereafter, the CPU 4a determines whether or not the local storage 9 has already been inserted therein (Step ST3a). That is, it is determined whether the local storage 9 has been inserted in the slot or attached to the connector.

When it is determined that the local storage 9 has already been inserted therein (Step ST3a; YES), the CPU 4a determines whether or not the local storage 9 is write-protected (Step ST4a). In this Step, when it is determined that the local storage 9 is write-protected (Step ST4a; YES), the processing is terminated.

When it is determined that the local storage 9 is not write-protected (Step ST4a; NO), the CPU 4a also stores in the local storage 9 the data stored in the internal local storage 9A in Step ST2a (Step ST5a). Namely, the data stored in the internal storage 9A is copied in the local storage 9.

By doing so, the data resulted by reproduction of a BD is stored in both the local storage 9 and the internal local storage 9A.

On the other hand, when the access request to the local storage is the read-out of data (Step ST1a; Read-out), the CPU 4a determines whether or not the local storage 9 has already been inserted therein (Step ST6a). In this Step, when it is determined that the local storage 9 has already been inserted therein (Step ST6a; YES), the CPU 4a starts processing of reading out from the local storage 9 the data that is read-out requested (Step ST7a).

When it is determined that the data read-out requested (target information) is located in the local storage 9 (Step ST8a; YES), the CPU 4a reads out the target information from the local storage 9 to transmit the information to the memory 7. The CPU 4b in the back-end unit 3 makes access to the memory 7 in the front-end unit 2 through the I/F units 10a, 10b and the transmission cable 10c to thus acquire the target information.

When the data read-out requested (target information) is not located in the local storage 9 (Step ST8a; NO), the CPU 4a performs processing of reading out the corresponding data from among the data stored in the internal local storage 9a (Step ST9a).

As described above, according to Embodiment 3, the front-end unit 2B further includes the internal local storage 9A that backs up the data stored in the local storage 9 on the board where the front-end unit is arranged, thereby providing a similar effect to that in Embodiment 1 described above, and also enhancing user's convenience relating to the access to the local storage 9 required by the BD standard.

Embodiment 4

Figure 7:
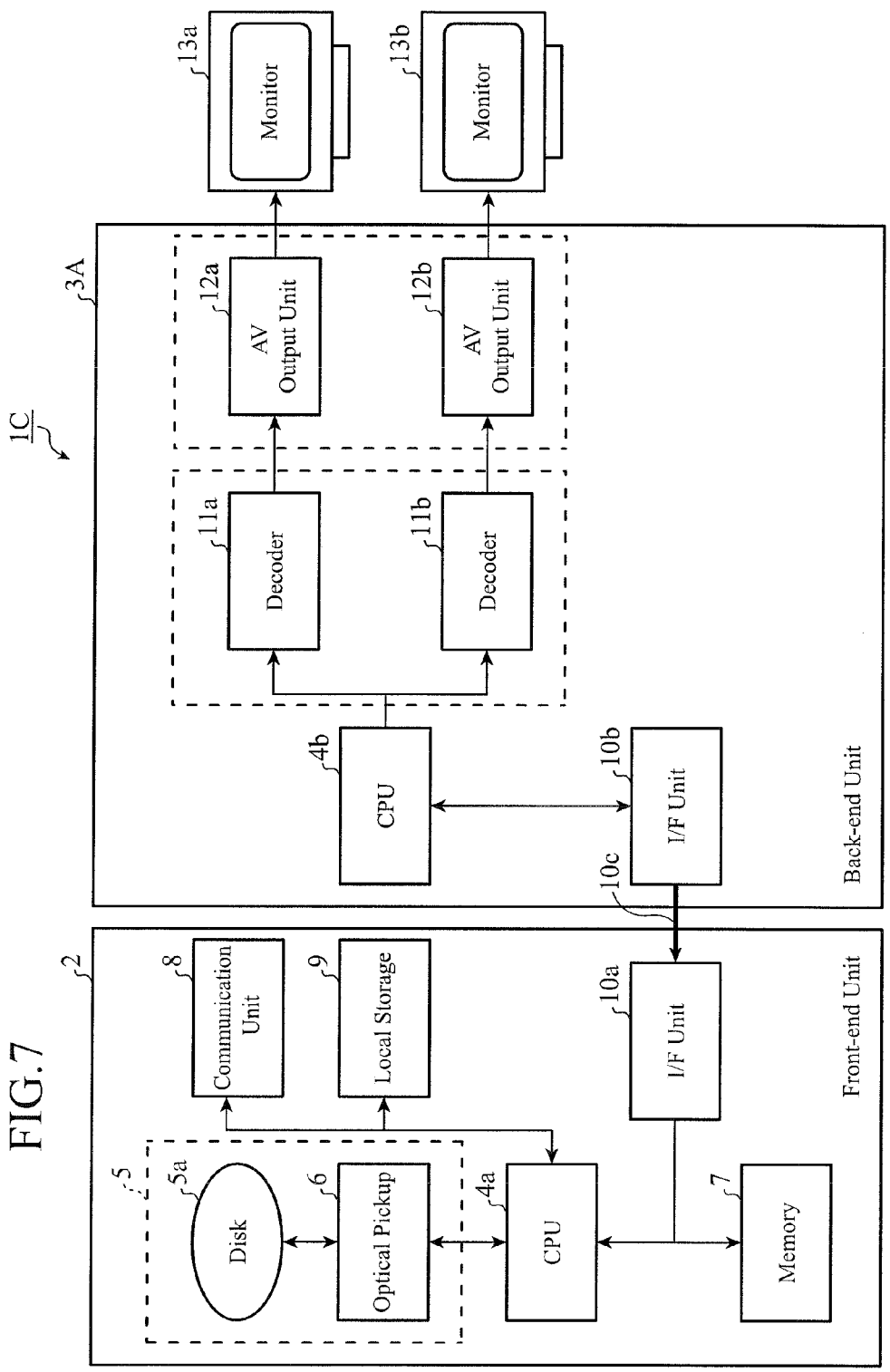
FIG. 7 is a diagram showing a configuration of a disk drive device according to Embodiment 4 of the invention.

FIG. 7 is a diagram showing a configuration of a disk drive device according to Embodiment 4 of the invention; the same reference numerals are given for the same components as those of FIG. 1 or components equivalent thereto, and detailed descriptions thereof will be omitted.

In FIG. 7, a disk drive device 1C according to Embodiment 4 has a board configuration divided into a front-end unit 2 and a back-end unit 3A.

In addition to a CPU 4a, a disk drive 5, a memory 7, and an I/F unit 10a, a communication unit 8 and a local storage 9 are arranged on a board of the front-end unit 2.

On the other hand, in addition to a CPU 4b and an I/F unit 10b, a data reproduction system composed of a decoder 11a and an AV output unit 12a, and another data reproduction system composed of a decoder 11b and an AV output unit 12b are arranged on a board of the back-end unit 3A. Note that the number of data reproduction systems may be two or more.

By controlling an operation of an optical pickup 6 of the disk drive 5, the CPU 4a of the front-end unit 2 reads out video/audio data from a disk 5a to transmit the data to the memory 7. The CPU 4b of the back-end unit 3A makes access to the memory 7 of the front-end unit 2 through the I/F units 10a, 10b and a transmission cable 10c to thus acquire the video/audio data read out from the disk 5a.

Then, by controlling the decoders 11a, 11b, the CPU 4b decodes the video/audio data acquired from the front-end unit 2, and outputs the resultant to the AV output units 12a, 12b.

The AV output units 12a, 12b outputs videos and sounds of the decoded results through monitor 13a, 13b. In this way, the duplication of the reproduction systems in the back-end unit 3A enables simultaneous decoding or simultaneous output of the video/audio data.

It is noted that in Embodiment 4, the local storage 9 is not only used for the access to the local storage required by a BD standard, but also any user file such as an audio file can be stored therein and reproduced.

For instance, on the reproduction of video/audio data of BDMV, while the access to the local storage 9 required by the BD standard is carried out, a user file located in a different storage region in the same local storage 9 is simultaneously reproduced.

In this case, a data transfer rate through the I/F units 10a, 10b and the transmission cable 10c is determined as a transfer rate necessary for performing simultaneously each of the reproduction of BDMV, the access to the local storage 9 required by the BD standard, and the reproduction of the user file readout from the local storage 9.

Meanwhile, a data transfer rate to the local storage 9 is determined as a transfer rate necessary for performing simultaneously each of the access to the local storage 9 required by the BD standard, and the reproduction of the used file stored in the local storage 9.

As describe above, according to Embodiment 4, since the back-end unit 3A has a plurality of data reproduction systems including the decoders 11a, 11b on the board in which the back-end unit itself is arranged, a similar effect to that in Embodiment 1 described above can be obtained, and it is also possible that any user file is stored and reproduced in the storage region of a part of the corresponding local storage 9, while the access to the local storage 9 required by the BD standard is carried out.

It is noted that in the present invention, it is possible to freely combine the embodiments, modify any component of the embodiments, or omit any component in the embodiments within the scope of the invention.

INDUSTRIAL APPLICABILITY

The disk drive device according to the present invention can resolve the positional restriction in the placement of the back-end unit, and hence it is suitable for an onboard disk drive device such that configurations with a variety of dimensions are required corresponding to vehicle types.

EXPLANATION OF REFERENCE NUMERALS 1, 1A-1C: disk drive devices, 2, 2A, 2B: front-end units, 3, 3A: back-end units, 4a, 4b: CPUs, 5: disk drive, 5a: disk, 6: optical pickup, 7: memory, 8: communication unit, 9: local storage, 9A: internal local storage, 10a, 10b: I/F units, 10c: transmission cable, 11, 11a, 11b: decoders, 12, 12a, 12b: AV output units, 13, 13a, 13b: monitors, 14: front panel face, 15a to 15c: switches.

The invention claimed is:

1. A disk drive device comprising:
a front-end unit that has a disk drive and a front-end controller for controlling the disk drive; and
a back-end unit arranged on a board different from that of the front-end unit, and including a decoder for reproducing data obtained by the said front-end unit and a back-end controller for controlling the decoder,
wherein the front-end unit includes a communication unit and a local storage to be used by the back-end controller on the board in which the front-end unit itself is arranged, and
wherein the front-end unit and the back-end unit include an interface unit that makes a connection in an accessible manner from the back-end controller to the communication unit and the local storage in the front-end unit.

2. The disk drive device according to claim 1, wherein the front-end unit includes a switch that is provided on the board in which the front end unit itself is arranged, and that turns on/off power supplies to the disk drive, the communication unit and the local storage, respectively, according to usage conditions of the disk drive, the communication unit, and the local storage.

3. The disk drive device according to claim 1, wherein the front-end unit further includes a local storage that backs up data stored in the local storage on the board where the front end unit itself is arranged.

4. The disk drive device according to claim 1, wherein the back-end unit includes a plurality of data reproduction systems including the decoder on the board where the back end unit itself is arranged.

* * * * *